SEARCH ROOM
C. Robinson,
Furniture Spring,
No. 240, A.I. June 14, 1859.
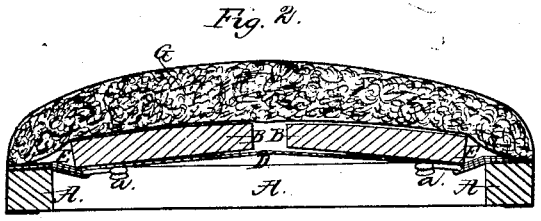
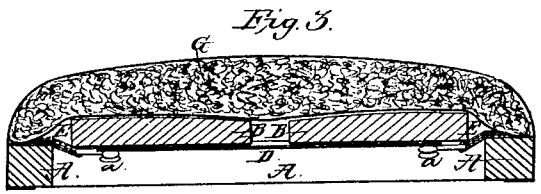
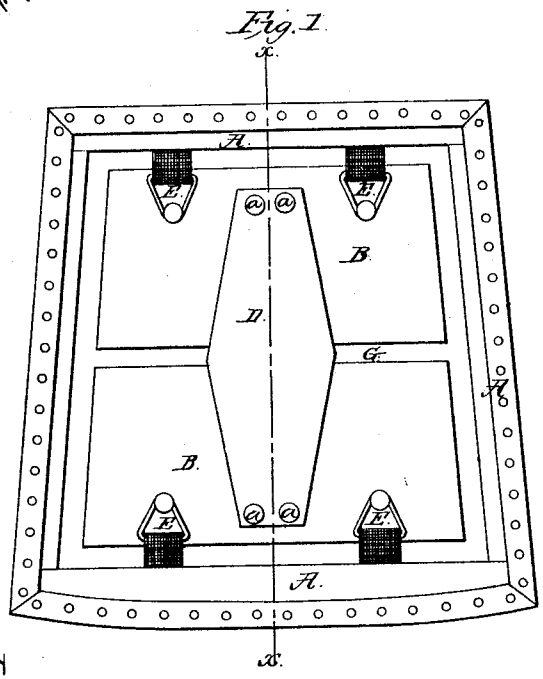
Witnesses:
William Gay
Cyrus B. Sharpe
Inventor:
Charles Robinson
N. PETERS, PHOTO-LITHOGRAPHER, WASHINGTON, D. C.